3,162,559
POLYAMIDE BASED SOLID PROPELLANTS
Richard O. Thomas, Arlington, James V. Duffy, Alexandria, and William D. Stewart, North Springfield, Va., assignors to Atlantic Research Corporation, a corporation of Virginia
No Drawing. Filed Feb. 19, 1960, Ser. No. 9,994
18 Claims. (Cl. 149—19)

This invention relates to new and improved solid propellent compositions.

Under many conditions of use, as, for example, in rocketry, solid propellent grains must withstand high vibrational and accelerative stresses without cracking or fissuring, which would have disastrous results. In many applications, it is also essential that the propellent composition have a high burning rate and that the burning rate not be excessively sensitive to changes in combustion chamber pressure.

The object of this invention is to provide solid propellent compositions, containing a polyamide as fuel and binder, which possess highly superior physical and ballistic properties.

Other objects and advantages of this invention will become obvious from the following detailed description.

We have discovered that solid propellent grains, comprising a polyamide fuel binder containing a dispersed solid oxidizer, are characterized by exceedingly high tensile strength, so that they can be subjected to high stresses without cracking or fissuring. Such grains, furthermore, burn cleanly at uniquely high rates and have a relatively low sensitivity to changes in combustion chamber pressure. The polyamide-based grains are chemically and physically very stable, so that they can be stored for long periods without deterioration. By suitable selection of the particular polyamide polymer, propellent grains can be obtained which have excellent high-temperature properties. This is of considerable importance, since difficulties have been experienced in modern rocketry, where grains subjected to high temperature conditions, caused, for example, by aerodynamic drag or proximity to hot components, lose tensile strength and/or become subject to plastic flow.

The polyamide selected for formulation of the propellent grain can be in solid or partly polymerized liquid form. If a solid, it should have, in either plasticized or unplasticized condition, a softening point which is at least about 100° C. and below the autoignition temperature of the propellent mixture. Polyamides softening below about 100° C. exhibit excessive plastic flow under conditions of high ambient temperature, and, of course, the propellent mixtures must be moldable into grains at temperatures below the ignition point of the propellant. The autoignition temperature of the polyamide-based grains is generally quite high, e.g., about 265° C. In some instances, however, the addition of special components, such as burning rate catalysts, may reduce the autoignition temperature to some extent, and the polyamide should be chosen with such factors in mind. In many cases, the molding temperature for consolidation of the propellant can be reduced by the addition of a suitable plasticizer for the polyamide, so that a polyamide which normally has a melting point close to or even above the autoignition temperature of the mix can safely be used.

Partly polymerized liquid polyamides can also be employed very effectively. The oxidizer can be slurried into the liquid polymer, with or without other components, such as a plasticizer, and the polymer cured to a solid by heating and the addition of suitable catalysts or curing agents, such as an epoxy or a polyisocyanate, to form the finished grain.

Suitable polyamides include: the reaction product of a diamine such as pentamethylene diamine, hexamethylene diamine, octadecylene diamine, decamethylene diamine, and 3-methylhexamethylene diamine, with a dibasic acid, such as sebacic acid, adipic acid, suberic acid, azelaic acid, undecanedioic acid, malonic acid, glutaric acid, pimelic acid, octadecanedioic acid, $\beta$-methyl adipic acid, p-phenylene-diacetic acid, and diphenic acid, as disclosed in U.S. 2,130,948; and the condensation products of aminoacids, such as 6-aminocaproic acid, and 11-amino-undecanoic acid, as disclosed in U.S. 2,071,253. Specific examples of such polyamides are polyhexamethylene adipamide, polyhexamethylene sebacamide, and the condensation product of 6-aminocaproic acid or caprolactam. The foregoing polyamides, generally, have high melting points (about 175°–235° C.) and are relatively insoluble in volatile organic solvents other than hot glacial acetic acid, formamide and phenol. They can be compression molded, preferably with the aid of a suitable plasticizer, to form propellent grains having excellent high-temperature properties and tensile strength.

Particularly suitable for our purpose are polyamides of reduced melting point, because of the greater ease of molding. Such polyamides are also generally more soluble in organic solvents, such as alcohols, glycols, chlorinated hydrocarbons, and the like, so that they can be processed by a solution technique which will subsequently be described. Examples of such polyamides include: interpolymers of two dibasic acids and amide-forming derivatives thereof, such as adipic and sebacic acids, with two diamines, such as hexamethylene diamine and decamethylene diamine, as disclosed in U.S. 2,252,554; terpolymers of a diamine, such as hexamethylene diamine, a dibasic acid and amide-forming derivatives thereof, such as adipic acid, and an amino acid and amide-forming derivatives thereof, such as a lactam, e.g., 6-aminocaproic acid or caprolactam, as disclosed in U.S. 2,252,555 and 2,252,557; interpolymers of hexamethylene diamine, adipic acid or sebacic acid, and amide-forming derivatives thereof and 6-aminocaproic acid and amide-forming derivatives thereof, such as caprolactam, as disclosed in U.S. 2,285,009; N-alkoxyalkyl such as N-methoxymethyl and N-ethoxymethyl, derivatives of polyamides formed by reaction of a diamine such as hexamethylene diamine, and a dibasic acid and amide-forming derivatives thereof, such as adipic acid and sebacic acid or of self-polymerized amino acid, such as 6-aminocaproic acid and 11-aminoundecanoic acid and amide-forming derivatives thereof as disclosed in U.S. 2,412,993, which in turn relates to polyamides such as disclosed in U.S. 2,071,250, 2,071,253 and 2,130,948; N-alkyl derivatives of polyamides formed by reaction of an alkylene diamine and a compound selected from the group consisting of alkylene dibasic acids and amide-forming derivatives thereof, as disclosed in U.S. 2,388,035; polyamides in which the diamine or dibasic acid component chain carries C-linked side groups or includes aryl groups or hetero groups, as disclosed in U.S.

2,464,693, 2,631,992, and 2,191,556; amide-ester interpolymers, such as the reaction product of hexamethylene diamine, sebacic acid, and amide-forming derivatives thereof and ethylene glycol, as disclosed in U.S. 2,224,037.

Partly polymerized, curable, liquid polyamides, include the condensation products of unsaturated fatty acids, such as the dimer or trimer of linoleic acid, with a polyamine.

Any solid oxidizer which yields oxygen readily for combustion of the polyamide binder fuel can be employed to form the composite propellants of this invention. Such oxidizers include the inorganic oxidizer salts, such as $NH_4$, K, Na, and Li perchlorates and nitrates, metal peroxides, such as $CaO_2$, $BaO_2$, and $Na_2O_2$, and the like. The amount of oxidizer incorporated is determined largely by the gas-generating properties required for a particular application, the specific oxidizer, and the specific composition of the propellant, which may include components other than the polyamide fuel binder, such as plasticizer, powdered metal fuel, and the like. The oxidizer must, of course, be present in sufficient amount to maintain active combustion of the fuel. In some cases this can be as low as 35% by weight of the propellant mix. Generally the oxidizer comprises a major proportion of the propellant composition. For optimum propulsive performance, oxidizer content may be as high as 80 to 90%.

When a solid polyamide is used, casting of the propellent grains generally requires compression molding at sufficiently elevated temperatures to soften the thermoplastic polymer in either unplasticized or plasticized form. The propellent mixes can be processed in a number of ways.

The polyamide, in finely divided state, can be admixed with the finely divided solid oxidizer; and the mixture of solids can then be introduced into a mold of proper shape and size, where it is subjected to sufficient heat and pressure to soften and consolidate the polymer, so that it forms a bonding matrix for the oxidizer.

In many cases, it is desirable to plasticize the polyamide polymer to improve its elastomeric properties and/or to reduce its softening point. This can be done by using a preplasticized polyamide molding powder or by adding a solid or liquid plasticizer to the polyamide-oxidizer mix.

We have found that polyamide, unplasticized or preplasticized, in the form of small, substantially spherical particles, preferably having a maximum diameter of about 100 mircons, produces especially satisfactory results when used in the dry solids molding procedure. Such spherical particles promote uniform dispersion of the other dry components of the mix, such as the solid oxidizer, solid plasticizer, and the like. When the spherical particles are also of different size, a substatial number, for example, having about twice the diameter of some of the smaller particles, improved loading of the propellant mix with the solid oxidizer and an improved molded product is also obtained. The smaller polyamide spheres fill the interstices between the larger polyamide spheres and the other solid components, thereby eliminating porosity and ensuring the formation of the continuous polyamide matrix essential to avoid the embrittlement, which might otherwise develop when large amounts of solid oxidizer are incorporated.

Still another procedure which we have found satisfactory is a solvent technique, in which one of the more soluble types of polyamide is dissolved in a volatile organic solvent, such as methanol, ethanol, aqueous methanol or ethanol solutions in which the water is in minor proportion, chlorinated hydrocarbon, e.g., chloroform or methylene chloride, mixtures of alcohol and chlorinated hydrocarbon, and the like. The solid oxidizer is then blended into the polymer solution in the requisite quantity. Although the inorganic oxidizer will ordinarilly not be soluble in the volatile organic solvent employed, the presence of water in a mixed solvent is not prejudicial, since any solubilized oxidizer is reprecipitated uniformly throughout the mixture upon volatilization of the solvent. This method also provides a convenient way to introduce a suitable plasticizer.

The slurry is poured, preferably, into thin sheets, and the volatile solvent removed. The resulting solid propellant comprises a plasticized or unplasticized polyamide matrix containing solid oxidizer uniformly distributed therein. A plurality of such sheets can then be consolidated under heat and pressure to form a propellant grain of the desired shape and size.

As aforementioned, though not essential, it is frequently desirable to include a plasticizer for the polyamide for such modification of physical properties as elasticity, softening point, and the like. The plasticizer can be any high-boiling organic compound, the boiling point preferably being above 125° C., which is a liquid or a solid at ordinary temperatures and which is compatible with the polyamide. Such plasticizers are well-known in the polyamide art and include, for example: diacetin, diethylene glycol dibenzoate, polyethylene glycol, glyceryl mono-stearate, 2-methylpentanediol, N-butyl diethanolamine, propylene glycol, hexylene glycol, isosebacic acid, dodecyl alcohol, octadecyl alcohol, N-ethyl o- and p-toluenesulfonamide, o- and p-toluenesulfonamide, butyl phthalyl butyl glycolate, and methyl phthalyl ethyl glycolate. The organic plasticizer also functions as a fuel component of the propellant since it burns to produce gaseous products of combustion.

Finely divided, solid fuels, such as powdered boron, silicon, and metals, e.g., Al, Mg, Zr, Be and Ti, can be introduced into the propellent compositions as an additional fuel component. Such metal powders possess the advantages both of increasing density and improving specific impulse because of their high heats of combustion. The metal particles should preferably be within a size range of up to about 50 microns. The amount of such metal fuel is not critical but is determined largely by the specific use and the amount, which, in combination with the finely divided solid oxidizer, can be successfully bonded by the polyamide into a solid propellant grain having good physical properties. Even very minor additions of the initial fuel, e.g., 1 or 2% by weight, increase density and heat of combustion. In general, the metal will constitute a minor proportion by weight of the propellent composition.

Other additives which can be incorporated into the propellent compositions include, for example, burning rate catalysts, such as copper chromite and ammonium dichromate; coolants for reducing the temperature of the generated gases, where necessary, as in the case of some turbine applications, such as monobasic ammonium phosphate; opacifiers, such as carbon black; and the like.

EXAMPLE 1

A polyamide interpolymer condensation product of hexamethylene diamine, adipic acid, sebacic acid, and caprolactam, was dissolved in a solvent mixture consisting of equal parts by weight of methanol and methylene chloride. Plasticizer and finely divided oxidizer were blended into the slurry. The mixture was allowed to air-dry by spreading it on aluminum foil. When sufficient solvent had evaporated to permit stripping, the mix was removed from the foil, placed in a vacuum oven, and dried to constant weight under vacuum at room temperature. Sheets containing $NH_4ClO_4$ as oxidizer were molded into propellent grains at 150° C. and 500 p.s.i. for 15 minutes. Those containing $NH_4NO_3$ wrere molded at 120° C. and 500 p.s.i. for 15 minutes.

Tables I and II summarize the results obtained.

Table I

| Polyamide, Parts | Plasticizer, Parts | $NH_4ClO_4$ | Remarks |
|---|---|---|---|
| 20 | 5 diacetin | 75 | Flexible at −20° C. Good tensile strength. |
| 20 | do | 75 | Flexible at −10° C. Good tensile strength.[1] |
| 13 | 8 diacetin | 79 | Good tensile strength. |
| 16.7 | 8.3 diacetin | 75 | Do. |
| 10.5 | 10.5 diacetin | 79 | Do. |
| 17.5 | 2.5 N-butyl diethanolamine | 80 | Do. |
| 17.5 | 2.5 hexylene glycol | 80 | Do. |
| 15 | 5 isosebacic acid | 80 | Do. |
| 15 | 5 dodecyl alcohol | 80 | Extremely tough. Flexible +5° C. |
| 15 | 5 octadecylalcohol | 80 | Hard, tough. |
| 17.5 | 2.5 diacetin | 80 | Flexible at approx. 0° C.[2] |
| 18.5 | 1.5 Santicizer 9 [3] | 80 | Flexible. Excellent tensile strength and fair elongation. |

[1] Some water added to the methanol-methylene chloride solution of the polyamide.
[2] Properties:
    Autoignition temperature: 264–265° C.
    Ultimate elongation: 425%.
    Tensile strength: 407 p.s.i.
    Young's Modulus: 2600:
    Burning rate exponent at 1000 p.s.i.=0.64.
    Burning rate at 1000 p.s.i.=0.73 in./sec.
[3] o- and p-Toluenesulfonamide solid plasticizer.

Table II

| Polyamide, Parts | Plasticizer, Parts | $NH_4NO_3$ | Remarks |
|---|---|---|---|
| 17.5 | 2.25 diacetin | 80 | Ammonium dichromate catalyst: .25 part added. Excellent tensile, burned cleanly. |
| 12.5 | 5.5 diacetin | 80 | Ammonium dichromate catalyst: 2.0 parts added. Flexible thru an angle of 180° at room temperature. Fair tensile, burned cleanly. |

EXAMPLE 2

Solid propellent strands containing $NH_4ClO_4$ were prepared as described in Example 1, except that the molding cure was conducted for 15 minutes at 155° C. and 1500 p.s.i. Physical properties of the propellants are summarized in Table III.

Table III

| | Percent Composition by Wt. Oxidizer/Polyamide/Plasticizer | Tensile Strength (p.s.i.) | Elongation, Percent | Young's Modulus (p.s.i.) |
|---|---|---|---|---|
| A | 75/20/5 | 268 | 312 | 1,000 |
| B | 80/17.5/2.5 | 243 | 300 | [1] 800 |
| C | 80/17.5/2.5 | 279 | 270 | 1,100 |
| D | 80/18.5/1.5 | 316 | 282 | 1,100 |
| E | 80/18.5/1.5 | 216 | 55 | 1,700 |

[1] Split along a horizontal axis during testing so that this result is doubtful.
NOTE 1.—The plasticizer in samples A, B, C, and D was diacetin and in sample E dibutylaminoethanol.
NOTE 2.—All the samples were flexible at ambient temperature.

EXAMPLE 3

A solid propellent grain was prepared by the solvent technique according to the procedure described in Example 1. After removal of the volatile methanol-methylene chloride solvent, the propellent material was placed in a 3 inch compression mold and cured at 150–160° C. for about 45 minutes. An initial pressure of 100 p.s.i. was increased by increments during the curing cycle until a final pressure of 8500 p.s.i. was obtained. The cured grain weighed 815 gms. and measured 4.5 inches in length and 3 inches in diameter.

A

Composition:
    $NH_4ClO_4$ _____ percent by wt__ 80
    Polyamide (the interpolymer of Example 1) _____ do____ 18.5
    Diacetin _____ do____ 1.5
Physical properties:
    Tensile strength _____ p.s.i__ 335
    Yield stress _____ p.s.i__ 168
    Ultimate elongation _____ percent__ 370
    Yield strain _____ do____ 22.3
    Young's modulus _____ p.s.i__ 1071
Ballistic properties:
    Burning rate at 1000 p.s.i. _____ in./sec__ 0.86
    Burning rate exponent at 1000 p.s.i. _____ 0.56

EXAMPLE 4

A solid propellent grain was prepared by the solvent technique according to the procedure described in Example 1. After removal of the volatile solvent, the propellent material was placed in a 3 inch compression mold and cured at 150–160° C. for about 2 hours. An initial pressure of 1000 p.s.i. was increased by increments during the curing cycle until a final pressure of 8500 p.s.i. was obtained. The cured grain weighed 743 gms. and measured 4 inches in length and 3 inches in diameter.

Composition:
    $NH_4ClO_4$ _____ percent by wt__ 79.96
    Polyamide (the interpolymer of Example 1) _____ do____ 18.44
    Diacetin _____ do____ 1.50
    Carbon black _____ do____ 0.10
Physical properties:
    Tensile strength _____ p.s.i__ 390
    Yield stress _____ p.s.i__ 250
    Ultimate elongation _____ percent__ 250
    Yield strain _____ do____ 7
    Young's modulus _____ p.s.i__ 4000
Ballistic properties:
    Burning rate at 1000 p.s.i. _____ in./sec__ 1.02
    Burning rate exponent at 1000 p.s.i. _____ 0.59

EXAMPLE 5

A polyamide interpolymer condensation product of hexamethylene diamine, adipic acid, sebacic acid, and caprolactam, was prepared in the form of spherical particles ranging in size from 1 to 35 microns, by the following procedure.

5 gms. of a sulfonated petroleum oil were stirred into 167 gms. of a 3% solution of the polyamide in a mixture of equal parts by weight of methanol and methylene chloride and the mixture emulsified in 150 ml. of water with vigorous agitation. The emulsion was added to one liter of water to elute the lacquer solvent from the particles. This mixture was poured into an evaporating pan and allowed to air-dry for 3 days without agitation. The spherical polyamide particles were separated from the water by centrifuging, washed with a 1:1 acetone/water solution, and vacuum dried.

A. 75 parts by weight of finely divided $NH_4ClO_4$ were mixed with 25 parts of the spherical polyamide product and molded into a grain at 155–160° C. and 2000 p.s.i. for 15 minutes. The grain was flexible and had excellent tensile strength and elongation.

B. 80 parts $NH_4ClO_4$ and 20 parts of the spherical polyamide were mixed and molded into a grain at 155–160° C. and 2500 p.s.i. for 15 minutes. The grain was hard, flexible and had excellent tensile strength and elongation.

C. 75 parts $NH_4ClO_4$, 20 parts of the spherical polyamide, and 5 parts of aluminum powder were mixed and molded into a grain at 155–160° C. and 1500 p.s.i. for 15 minutes. The grain was flexible at room temperature and had excellent tensile strength and elongation.

EXAMPLE 6

A solid propellant grain of the following composition was prepared by the solvent technique according to the procedure described in Example 1. After removal of the volatile solvent, the propellant was molded at 155–160° C. and 1500 p.s.i. for 15 minutes. The grain was tough and had excellent tensile strength.

Composition:                                                   Percent
$NH_4ClO_4$ _____ 80
Polyamide (N-methoxymethyl derivative of
  polyhexamethylene adipdiamide) _____ 18.5
Diacetin _____ 1.5

Although this invention has been described with reference to illustrative embodiments thereof, it will be apparent to those skilled in the art that the principles of this invention can be embodied in other forms but within the scope of the claims.

We claim:
1. A solid propellant consisting essentially of a finely divided, solid, inorganic oxidizer selected from the group consisting of salts and peroxides dispersed in a matrix of a polyamide fuel binder, said polyamide being selected from the group consisting of
  (1) Interpolymers of
    (a) two compounds selected from the group consisting of alkylene dibasic acids and amide-forming derivatives thereof; and
    (b) two alkylene diamines;
  (2) terpolymers of
    (a) an alkylene diamine,
    (b) a compound selected from the group consisting of an alkylene dibasic acid and an amide-forming derivative thereof, and
    (c) a compound selected from the group consisting of an amino acid in which the >N— and the

group are connected by an alkylene group and an amide-forming derivative thereof;
  (3) interpolymers of
    (a) an alkylene diamine,
    (b) two compounds selected from the group consisting of alkylene dibasic acids and amide-forming derivatives thereof;
    (c) a compound selected from the group consisting of an amino acid in which the >N— and the

are connected by an alkylene group and amide-forming derivatives thereof;
  (4) N-alkoxyalkyl derivatives of polyamides selected from the group consisting of
    (a) the reaction product of
      (aa) an alkylene diamine and
      (bb) a compound selected from the group consisting of alkylene dibasic acid and amide-forming derivatives thereof, and
    (b) the self polymer of a compound selected from the group consisting of amino acid in which the >N— and

are connected by an alkylene group, and amide-forming derivatives thereof;
  (5) N-alkyl derivatives of the reaction products of
    (a) an alkylene diamine and
    (b) a compound selected from the group consisting of alkylene dibasic acid and amide-forming derivatives thereof;
  (6) interpolymers of
    (a) an alkylene diamine,
    (b) a compound selected from the group consisting of alkylene dibasic acid and amide-forming derivatives thereof, and
    (c) an alkylene polyhydroxy alcohol, the oxidizer being present in amount sufficient to maintain active combustion of said fuel.

2. The propellant of claim 1 which includes a high boiling plasticizer for the polyamide.

3. The propellant of claim 1 which includes a finely divided solid fuel component selected from the group consisting of boron, silicon, and a metal, in an amount comprising a minor proportion by weight of said propellent composition.

4. The propellant of claim 16 in which the polyamide is an interpolymer condensation product of hexamethylene diamine, adipic acid, sebacic acid, and a compound selected from the group consisting of 6-aminocaproic acid and caprolactam.

5. The propellant of claim 17 in which the polyamide is an interpolymer condensation product of hexamethylene diamine, adipic acid, sebacic acid, and a compound selected from the group consisting of 6-aminocaproic acid and caprolactam.

6. The propellant of claim 18 in which the polyamide is an interpolymer condensation product of hexamethylene diamine, adipic acid, sebacic acid, and a compound selected from the group consisting of 6-aminocaproic acid and caprolactam.

7. The propellant of claim 4 in which the plasticizer is diacetin and the oxidizer is ammonium perchlorate.

8. The propellant of claim 1 in which the polyamide is an N-alkoxyalkyl derivative of the polyamide condensation product of an alkylene diamine and a compound selected from the group consisting of an alkylene dibasic acid and an amide-forming derivative thereof.

9. The propellant of claim 2 in which the polyamide is an N-alkoxyalkyl derivative of the polyamide condensation product of an alkylene diamine and a compound selected from the group consisting of an alkylene dibasic acid and an amide-forming derivative thereof.

10. The propellant of claim 8 in which the polyamide is an N-methoxymethyl derivative of the polyamide condensation product of an alkylene diamine and a compound selected from the group consisting of an alkylene dibasic acid and an amide-forming derivative thereof.

11. The propellant of claim 9 in which the polyamide is an N-methoxymethyl derivative of the polyamide condensation product of an alkylene diamine and a compound selected from the group consisting of an alkylene dibasic acid and an amide-forming derivative thereof.

12. A process for making a solid propellent grain which comprises compression molding a mixture of a polyamide, said polyamide being in the form of substantially spherical particles, said polyamide being selected from the group consisting of
  (1) Interpolymers of
    (a) two compounds selected from the group consisting of alkylene dibasic acids and amide-forming derivatives thereof; and
    (b) two alkylene diamines;
  (2) terpolymers of
    (a) an alkylene diamine,
    (b) a compound selected from the group consisting of an alkylene dibasic acid and an amide-forming derivative thereof, and
    (c) a compound selected from the group consisting of an amino acid in which the >N— and the $-C=O$
    $\setminus$ group are connected by an alkylene group and an amide-forming derivative thereof;
  (3) interpolymers of
    (a) an alkylene diamine, (b) two compounds selected from the group consisting of alkylene dibasic acids and amide-forming derivatives thereof;
(c) a compound selected from the group consisting of an amino acid in which the >N— and the $$-C=O$$

are connected by an alkylene group and amide-forming derivatives thereof;
(4) N-alkoxyalkyl derivatives of polyamides selected from the group consisting of
  (a) the reaction product of
    (aa) an alkylene diamine and
    (bb) a compound selected from the group consisting of alkylene dibasic acid and amide-forming derivatives thereof, and
  (b) the self polymer of a compound selected from the group consisting of amino acid in which the >N— and $$-C=O$$

are connected by an alkylene group, and amide-forming derivatives thereof;
(5) N-alkyl derivatives of the reaction products of
  (a) an alkylene diamine and
  (b) a compound selected from the group consisting of alkylene dibasic acid and amide-forming derivatives thereof;
(6) interpolymers of
  (a) an alkylene diamine,
  (b) a compound selected from the group consisting of alkylene dibasic acid and amide-forming derivatives thereof, and
  (c) an alkylene polyhydroxy alcohol, and a finely divided solid, inorganic oxidizer selected from the group consisting of salts and peroxides, the oxidizer being present in amount sufficient to maintain active combustion of the polyamide.

13. The process of claim 12 in which the mixture includes a high boiling plasticizer for the polyamide.

14. The process of claim 12 in which the mixture includes a finely divided solid fuel component selected from the group consisting of boron, silicon, and a metal, in an amount comprising a minor proportion by weight of said propellent composition.

15. The process of claim 13 in which the polyamide is an inter-condensation product of hexamethylene diamine, adipic acid, sebacic acid, and a compound selected from the group consisting of 6-amino-caproic acid and caprolactam.

16. The propellant of claim 1 in which the polyamide is an interpolymer condensation product of an alkylene diamine, two compounds selected from alkylene dibasic acids and amide-forming derivatives thereof, and a compound selected from the group consisting of an amino acid in which the >N— and the $$-C=O$$

are connected by an alkylene group and amide-forming derivatives thereof.

17. The propellant of claim 16 which includes a high boiling plasticizer for the polyamide.

18. The propellant of claim 16 which includes a finely divided, solid fuel component selected from the group consisting of boron, silicon, and a metal, in an amount comprising a minor proportion by weight of said propellent composition.

References Cited by the Examiner
UNITED STATES PATENTS

| | | | |
|---|---|---|---|
| 2,622,277 | 12/52 | Bonnell et al. | |
| 2,857,258 | 10/58 | Thomas | 149—19 |
| 2,877,504 | 3/59 | Fox. | |
| 2,926,613 | 3/60 | Fox | 149—15 |

OTHER REFERENCES

Zaehringer: "Chem. Engineering Progress," vol. 51, No. 7, July 1955, page 302.

Missiles and Rockets, vol. 2, No. 8, August 1957, page 71.

Noland: Chemical Engineering, May 19, 1958, page 155.

Zaehringer: "Solid Propellant Rockets—Second Stage," American Rocket Co., Box 1112, Wyandotte, Mich. (1958), pages 80 and 207–219.

CARL D. QUARFORTH, Primary Examiner.

LEON D. ROSDOL, ROGER L. CAMPBELL,
Examiners.